Sept. 4, 1928.
S. B. HASELTINE
1,683,461
HAND BRAKE FOR RAILWAY CARS
Filed Oct. 20, 1923
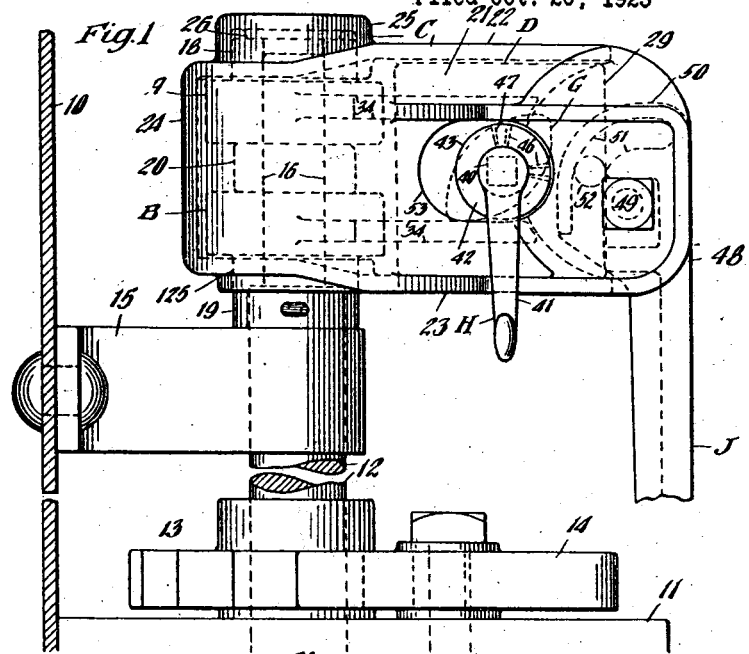
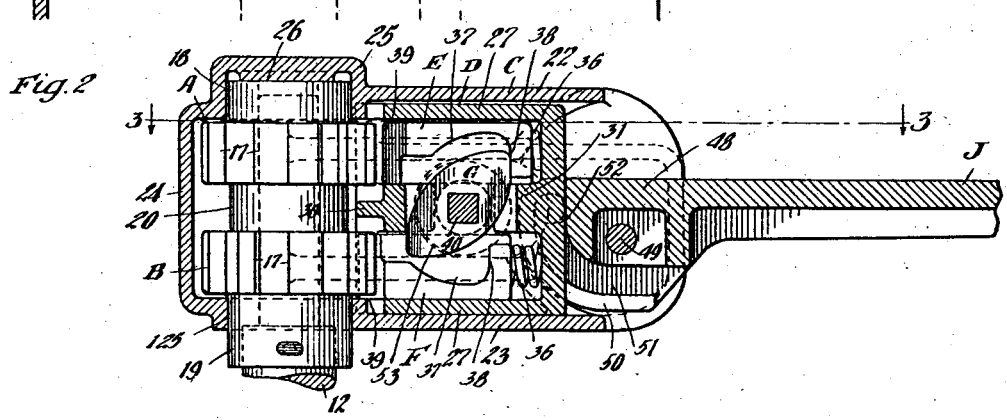
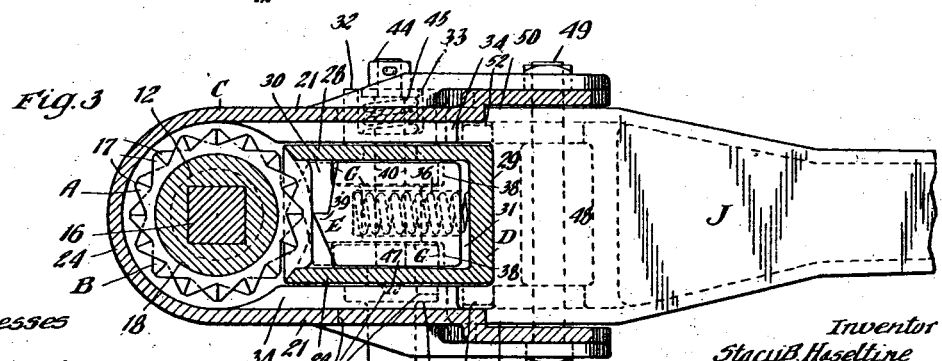
Witnesses
Wm. Geiger
Inventor
Stacy B. Haseltine
By George L. Haight
His Atty Patented Sept. 4, 1928.

1,683,461

UNITED STATES PATENT OFFICE.

STACY B. HASELTINE, OF CHICAGO, ILLINOIS, ASSIGNOR, BY MESNE ASSIGNMENTS, TO W. H. MINER, INC., A CORPORATION OF DELAWARE.

HAND BRAKE FOR RAILWAY CARS.

Application filed October 20, 1923. Serial No. 669,660.

This invention relates to improvements in hand brakes for railway cars.

One object of the invention is to provide a simple and practical hand brake of the ratchet type, wherein means is provided for positively rotating the brake in unwinding as well as winding direction, whereby the brake may be turned off to fully release the same.

More specifically an object of the invention is to provide a hand brake of the vertical staff type, especially adapted for railway cars, wherein means is provided for rotating the staff in reverse directions including a pair of ratchet wheels fixed to the staff and having the teeth thereof reversely arranged, a pair of pawls coacting respectively with said ratchet wheels, means for holding either of said pawls in inoperative position and a manually controlled lever for moving the operative pawl into and out of engagement with the ratchet wheel.

In the drawing forming a part of this specification, Figure 1 is a side elevational view of my improved brake, showing the same as applied to the end wall of the car, the end wall being broken away and in vertical section. Figure 2 is a vertical, sectional view of the upper portion of the mechanism, illustrated in Figure 1. And Figure 3 is a horizontal, sectional view corresponding substantially to the line 3—3 of Figure 2.

In said drawing, 10 denotes the end wall of a car such as a gondola, 11 the usual platform or step for the brakeman, and 12 the brake staff. As is well understood in the art, the vertical brake staff usually has a drum at the bottom thereof around which the chain leading to the brake beam winds. As is also customary the brake staff is provided with a ratchet 13 adjacent the platform 11 and with which is adapted to cooperate a foot controlled locking dog 14.

The improved brake mechanism, as shown, comprises, broadly, a pair of ratchet wheels A and B on the brake staff; a housing C oscillatable about the staff; a slide D within the housing; a pair of spring pressed pawls E and F reciprocally mounted in the slide; a pair of cam members G—G coacting with the respective pawls; a crank H for operating the cams; and an operating lever J pivotally mounted in the housing.

In carrying out my invention, I provide a suitable bearing bracket 15 near the upper end of the staff 12, said bracket being secured in any suitable manner, preferably by rivets to the wall 10 of the car and provided with a bearing for the staff. Above the bracket 15, the staff 12 is provided with a squared section 16 on which the ratchet wheels A and B are mounted, the latter being provided with square openings fitting the square section of the shaft so that the wheels are rotatable therewith. As clearly shown in Figure 1, the cylindrical portion of the shaft extends a short distance above the bracket 15.

The ratchet wheels A and B are each provided with peripheral teeth 17, the teeth of the wheel A being reversely arranged to the teeth of the wheel B. The ratchet wheels A and B are each also provided with a hub member projecting from one side thereof, the hub member 18 of the ratchet member A being shorter than the hub member 19 of the ratchet member B. To maintain the ratchet members A and B in proper spaced relation, a collar 20 is interposed between the same, the latter being also provided with a square opening fitting the squared portion of the staff. Upon reference to Figure 2 it will be noted that when the parts are assembled on the staff, the hub 18 of the ratchet wheel A extends upwardly while the hub 19 of the ratchet wheel B extends downwardly, the latter being secured to the staff 12 by a cotter pin extending transversely through the hub and the staff. In this connection, it will be noted that the cylindrical portion of the staff 12 extends a short distance within the hub 19, the lower end of the latter being properly recessed to receive the same.

The housing C, which serves as a weather protecting casing or shield for the ratchet mechanism, is of box-like form having spaced side walls 21—21, top and bottom walls 22 and 23 and a curved end wall 24, the housing being open at the opposite end. Adjacent the curved end wall 24, the top of the housing is provided with a cylindrical bearing projection 25 adapted to receive the hub 18 of the ratchet wheel A. The top wall of the bearing projection 25 is provided on the interior thereof with a downwardly extending boss 26 bearing on the upper end of the hub 18, thereby preventing endwise movement of the ratchet wheels. The lower wall 23 of the housing is provided with a bearing opening 125 adapted to receive the hub 19 of the ratchet member B. As clearly shown in Figure 3, the side walls 21 at the open end of the housing are offset outwardly and are adapted to receive the end of the lever J therebetween and the upper and lower walls 22 and 23 terminate short of the side walls at the open end of the housing to provide proper clearance for the lever J.

The slide D is of hollow box-like form having spaced top and bottom walls 27—27, side walls 28—28 and an end wall 29. Midway between the top and bottom walls, the slide member D is provided with transversely extending webs 30 and 31, thereby providing upper and lower guideways adapted to accommodate the pawls E and F respectively. The web 31 is formed integral with the end wall of the slide and the web 30 is spaced therefrom a sufficient distance to accommodate the shaft of the crank member H. One of the side walls 28 of the slide has an opening therein adapted to pivotally accommodate a cylindrical spring housing 32 provided with a socket 33. The slide D is of such a height as to fit between the upper and lower walls 22 and 23 of the housing and is guided for sliding movement within the housing by longitudinal ribs 34 on the side walls of the housing, there being preferably two of such ribs on each side wall.

The pawls E and F are of like construction, each being in the form of a block slidably mounted in one of the guideways of the slide D. Each of the pawls is provided with a central bore open at the rear end and adapted to receive a spring 36 bearing on the rear wall 29 of the slide. The opposite sides of each pawl E and F are cut away as indicated at 37, thereby providing vertically extending shoulders 38 at the rear end thereof. At the forward end, each pawl is provided with a tooth 39 adapted to coact with one of the ratchet wheels, the tooth of the pawl E being reversely arranged to the tooth of the pawl F, the arrangement being such that when the pawl E is in engagement with the ratchet wheel A, the staff will be rotated in a counter clockwise direction.

The crank H is made in one piece and comprises a shaft 40, an operating lever arm 41 and a flanged head 42 having a cylindrical bearing portion 43 thereon journaled in a bearing opening in the corresponding side wall of the slide D. The central portion of the shaft is of square cross section, extending through a squared opening in the spring housing 32, which is of cylindrical cross section and is journaled in the other side wall of the slide D. At the free end, the shaft 40 is threaded and provided with a flanged cap 44 preferably secured thereto by means of a transversely extending cotter pin. A spring 45 is interposed under some initial compression between the bottom wall of the socket 33 and the flanged end of the cap, thereby yieldingly maintaining the flange of the head 42 in contact with the corresponding side wall of the slide. On the inner face of the flange of the head 42 are provided a pair of radially disposed notches 46 adapted to coact with a lug 47 on the side wall of the housing, the notches being spaced 90° apart. It will be seen that means is thus provided for retaining the shaft in two adjusted positions approximately 90° apart.

The cam members G—G are of like construction, each being preferably in the form of an oval plate provided with a central square opening adapted to receive the square portions of the shaft so that the same will be rotated with the shaft. The cam members G are disposed on opposite sides of the pawls and are accommodated in the cut away portions thereof so as to have free rotary movement. The upper ends of the cam members are adapted to engage with the shoulders 38 of the pawl E and the lower ends of the same are adapted to engage with the corresponding shoulders 38 of the pawl F, thereby serving to retain either of the pawl members in retracted position within the slide D. In this connection, it is pointed out that when the cam members are in the position shown in the drawing, the upper ends thereof coact with the pawl E to hold the same retracted within the slide, the pawl F being free to move and being yieldingly held in its outermost position by the corresponding spring 36. It will be evident that with the slide in the position shown in Figure 2, the pawl E will be held clear of the upper ratchet wheel and the pawl F will be held in yielding engagement with the ratchet wheel B, whereby upon oscillation of the housing about the axis of the staff, the latter will be rotated intermittently in a clockwise direction, as seen in Figure 3.

The lever J is pivotally connected to the housing to swing in a vertical plane, the same being provided with a head 48 disposed between the side walls 21 of the housing and pivotally connected thereto by a pivot bolt 49. The head 48 is cut away to provide a forked portion 50, the side members of which are adapted to straddle the slide D. The inner faces of the side members of the forked portion are provided with guide slots 51, each having a curved section eccentric with the pivot bolt 48 and a straight section approximately parallel to the handle and adapted to slidingly receive a pin 52 projecting from the corresponding side of the slide D and formed integral therewith. The lever is thus connected to the side to reciprocate the same. As the lever is oscillated vertically, the slide will be moved to and fro as the pins pass along the eccentric portions of the slots in the handle J. To permit the necessary reciprocating movement of the slide D, the opposite side walls 21 of the housing are provided with alined openings 53 adapted to respectively accommodate the head 42 of the crank H and the cylindrical spring housing 32 at the opposite side of the slide D for reciprocating movement.

In the operation of my improved hand brake, the handle J is raised from the position shown in Figure 1 to that shown in Figure 2, thereby advancing the slide toward the staff and effecting engagement of one of the pawls E or F to the corresponding ratchet wheel, the other pawl being held in retracted position by the cam members G. Upon oscillation of the handle J in a horizontal plane about the axis of the staff, the latter will be rotated in either a clockwise or contra-clockwise direction, depending upon which pawl is in operative position. It will be evident that during this time the cam members G are retained in position by engagement of one of the notches on the head 42 with the lug 47 on the guide D. To effect rotation of the staff in a reverse direction the crank H is rotated through an arch of 90°, thereby bringing the cams into engagement with the shoulders 38 of the pawl which is in engagement with the corresponding ratchet member and withdrawing the same to inoperative position and permitting the other pawl to be projected into engagement with the corresponding ratchet wheel. During this rotation of the crank, as will be evident, the other notch on the head thereof will be brought into registration with the lug on the slide to retain the crank in position. In this connection, it will be noted that endwise movement of the shaft of the crank is permitted due to the yielding action of the spring 45, thereby permitting the disengagement of either of the notches 46 and the lug 47. When the handle J is again oscillated about the staff 12, the latter will be rotated in a direction reverse to that just described. It will be evident that in turning the staff in one direction, the brake chain will be wound upon drum and when the same is rotated in the reverse direction, the chain will be unwound, thereby permitting the brake to be turned off to fully release the same, it being understood that the locking dog 14 is disengaged from the ratchet wheel 13 during the unwinding operation. To retract the slide D and thereby bring both pawls to an inoperative position, it is merely necessary to swing the handle from the position shown in Figure 2 to that shown in Figure 1. It will be evident that although the handle J may be manually moved from the position shown in Figure 2 to that shown in Figure 1, this is not necessary because the weight of the lever will cause the same to drop by gravity when released by the operator.

I have herein shown and described what I now consider the preferred manner of carrying out my invention but the same is merely illustrative and I contemplate all changes and modifications that come within the scope of the claims appended hereto.

I claim:

1. In a brake, the combination with rotatable chain tightening members; of a pair of ratchet wheels fixed to said members, said wheels having reversely arranged teeth; a lever operated slide; a pair of spring pressed pawls on said slide; and means for alternately holding either of said pawls in inoperative position.

2. In a brake, the combination with a rotatable chain tightening member; of ratchet means for rotating said member alternately in opposite directions including a lever operated slide and alternately operative spring pressed pawl means mounted on said slide.

3. In a brake, the combination with rotatable brake tightening means; of operating means therefor, including a lever mounted for oscillating movement about the axis of rotation of said tightening means and movable to operative and inoperative positions, and a pair of separate, coacting intermittent grip means on said lever and tightening means, said intermittent grip means being selectively operable for rotating said tightening means in opposite directions, engagement of said grip means being controlled by the position of said lever.

4. In a brake, the combination with a rotatable shaft for tightening the brakes; of selectively operable intermittent grip means for rotating said shaft in one direction to tighten the brakes and in a reverse direction to slacken the brakes, said grip means being bodily movable to free said shaft.

5. In a brake of the vertical staff type, the combination with a rotatable vertical staff having a pair of ratchet wheels at the top thereof rotatable in unison therewith, the teeth of said wheels being reversely arranged; a spring operated pawl coacting with each wheel; a slide on which said pawls are movably mounted; means on said slide for holding either of said pawls in inoperative position; and an operating lever engaging said slide for moving the operative pawl into engagement with the corresponding ratchet wheel.

6. In a brake of the vertical staff type, the combination with a rotatable vertical staff having a pair of ratchet wheels at the upper end thereof, said wheels having the teeth thereof reversely arranged; a housing oscillatable about said staff; a lever for oscillating said housing, said lever being pivotally connected to the housing to swing in a vertical plane; a slide reciprocally mounted within the housing and adapted to be moved toward and away from the staff by said lever; a pair of spring pressed pawls reciprocally mounted in the slide and adapted to coact respectively with said ratchet wheels, and manually operated means mounted on said slide adapted to engage said pawls to move either of the same to inoperative position and retain it in that position.

7. In a brake, the combination with a rotatable shaft having oppositely disposed ratchet means rotatable in unison therewith; of a pair of spring actuated pawls each cooperable with said ratchet means in one direction; a movable member on which said pawls are movably mounted; means on said member for holding either of said pawls in inoperative position; and means coacting with said pawls for rotating said shaft in either direction.

8. In a brake, the combination with a rotatable brake tightening means; of operating means movable to operative and inoperative positions; and ratchet mechanism controlled by the movement of said operating means, said ratchet mechanism being operable to effect rotation of said tightening means in opposite directions.

In witness that I claim the foregoing I have hereunto subscribed my name this 12th day of October, 1923.

STACY B. HASELTINE.